United States Patent [19]

Seberger

[11] Patent Number: 5,193,192
[45] Date of Patent: Mar. 9, 1993

[54] VECTORIZED LR PARSING OF COMPUTER PROGRAMS

[75] Inventor: David A. Seberger, Livermore, Calif.

[73] Assignee: Supercomputer Systems Limited Partnership, Eau Claire, Wis.

[21] Appl. No.: 571,502

[22] Filed: Aug. 23, 1990

Related U.S. Application Data

[63] Continuation-in-part of Ser. No. 537,466, Jun. 11, 1990, which is a continuation-in-part of Ser. No. 459,053, Dec. 29, 1989.

[51] Int. Cl.$^5$ .............................................. G06F 9/45
[52] U.S. Cl. ............................. 395/700; 364/DIG. 1; 364/280.4; 364/280; 364/255.5; 364/255.1
[58] Field of Search .......................... 395/700; 364/419

[56] References Cited

U.S. PATENT DOCUMENTS 5,105,353  4/1992  Charles et al. ...................... 395/700

OTHER PUBLICATIONS

Robin Hunter, "The Design and Construction of Compilers," John Wiley & Sons Ltd., 1981, pp. 97-120.
Arthur B. Pyster, "Compiler Design and Construction," Van Nostrand Reinhold Co., Inc., 1980, pp. 54-72.

Primary Examiner—Paul V. Kulik
Attorney, Agent, or Firm—Herbert F. Somermeyer; Earl C. Hancock

[57] ABSTRACT

A parser for parsing computer programs in a compiler has parsing tables arranged as linear vectors. In a reduction portion of the parser, a production table and a lookahead set table have paired entries at identical address offsets such that a one-to-one relationship exists between each lookahead set in the lookahead set table and the representation of the lookahead set in the lookahead set table. In a read transition portion of the parser, an entrance symbol table has entries paired with transition state representations and each pair being at an identical address offset in the respective tables. For a reduction or read transition operation, the lookahead set table or the entrance symbol table is scanned to find the appropriate entry. Once the appropriate entry is found, the production table or the transition state table is addressed using the offset of the appropriate entry found during the scanning process.

11 Claims, 3 Drawing Sheets

VECTORIZED LR PARSING OF COMPUTER PROGRAMS

RELATED APPLICATIONS

This application is a continuation-in-part of commonly assigned U.S. patent application Ser. No. 07/537,466, filed Jun. 11, 1990, for INTEGRATED SOFTWARE ARCHITECTURE FOR A HIGHLY PARALLEL MULTIPROCESSOR SYSTEM by George A. Spix et al., that is a continuation-in-part of commonly-assigned U.S. patent application Ser. No. 07/459,083, filed Dec. 29, 1989.

FIELD OF THE INVENTION

The present invention relates to parsing computer programs for use in a compiling system. The invention relates more particularly to vectorized parsing tables in an LR automatic parser for enabling taking advantage of highly pipelined computer systems in a compiler.

BACKGROUND OF THE INVENTION

Each programming language uses its own syntax and semantics; syntax used in the Fortran language is different from the C language syntax, etc. Programs written in any programming language have to be compiled, and during that process their syntax and semantics are verified. Syntax is the structure and specification of each language according to rules established for each language, i.e. grammar. Semantics of each language is the meaning conveyed by and associated with the syntax of such language. In compiling computer programs, parsing is an analysis of a stream of program expressions (sentences) for determining whether or not the program expressions are syntactically correct. Once it is determined that a stream of program expressions is syntactically correct, that stream of program expressions can be compiled into executable modules. Parsing is automatically performed in a computer using a computer program.

In parsing a computer program input stream, written in Fortran, for example, a scanner using a set of rules groups predetermined characters in the input steam into tokens. Scanners are programs constructed to recognize different types of tokens, such as identifiers, decimal constants, floating point constants, and the like. In recognizing or identifying a token, a parser may look ahead in the input stream for additional predetermined characters for finding additional tokens.

The parser imposes a structure on the sequence of tokens using a set of rules appropriate for the language. Such rules are referred to as a context-free grammar; such rules are often specified in the so-called and well known Backus Naur form. A such a grammar specification for a program expression consisting of decimal digits and the operations "+" and "*" may be represented as follows:

E : E "+" T
E : T
T : T "*" F
T : F
F : decimal_digits

Each of the five grammar rules above, one on each line, is referred to as a "production". In the above program specification the tokens detected by the scanner are "+", "*" and decimal_digits. Such tokens are passed to the parser program. Each string in the input stream that is parsed as having correct syntax is said to be "accepted". For example, the string 2+3*5 is "accepted" while the string 2+ +5 will be rejected as syntactically incorrect.

A left-to-right, right-most derivation (LR) parser accepts a subset of a context-free grammar. Each LR parser has an input, an output, a push-down stack, a driver program and a parsing table. The parsing table is created from the grammar of the language to be parsed and is unique to such language and its grammar. The driver program serially reads tokens one at a time from the input stream. The input stream is typically stored in a computer storage and is scanned by the driven program scanning the stored input steam to fetch the tokens. Based upon the information in the parsing table that corresponds to the token being analyzed (input token) and the current program state, the driver program may shift the input token into the stack, reduce it by one of the productions, accept a string of such tokens, or reject the string of such tokens as being syntactically wrong. Reduction means that the right-hand side of a production is replaced by the left-hand side. An LR parser may also fetch a next token from the input stream for determining whether or not to shift or to reduce the token. Such a token is termed a "lookahead" token and is referred to herein as a look ahead portion of the input stream. The lookahead portion may include more than one token. When an LR parser performs reduction, additional semantic checks (also termed semantic actions) are performed.

Parsers use tables in the parsing process. It is desired enhance the parsing process, particularly in an LR(k) parser, wherein k is the lookahead limit in the parsing. As indicated above, such parsers are well known as taking a tokenized sentence from a computer language to produce an output which is a canonical parse of the sentence. While the actual parsing procedure is performed by a known parser interpreter, the parser table itself is in a form of data structures or tables. The tables are generated or established by a so-called LR analyzer as a series of data loaded variable declarations from a context free grammar for each language being parsed, each language will be parsed by interpreting the parsing tables established for each language.

As mentioned above, each LR parser consists of a known modified finite automation with an attached push-down stack. At each discrete instance during a parsing operation, parser control resides in one of the parser's machine states, the stack being filled with the most recent past parser states. The parser is looking ahead in the input stream (the computer program to be parsed and compiled) for a next token. Each parser state offers an automatic choice between two types of actions; reductions and read transitions. Each parser state may contain any number of defined reductions or read transitions to be utilized in parsing.

Reductions, as mentioned above, consist of a production number P and a collection of terminal symbols R, taken as a pair, and are always considered first in each state of the parser. If lookahead symbol L is in set R for production P, then the reduction is to be performed (there can never be more than one candidate pair). As output of the production, the number P is given to a semantic synthesizer. Then, as many states as there are symbols on the right hand side of production P are popped off the stack; the non-terminal on the left-handed side of the production P is put in place for the next look ahead (the original lookahead L is pushed back into the input stream) and the state exposed at the top of the push-down stack takes control of the parser action.

Read transitions consist of pairs of parser stages S and vocabulary symbols X. When the lookahead symbol L matches the read symbol X, by construction there can be at most one such match, and lookahead symbol L is stripped from the input stream, state S is pushed onto the stack and state S controls the parsing operation. LR parsers always begin in a state 0 (zero) with the push-down stack being empty and finished with production 0 which is the production:

<system goal symbol> ::= ⌐ | ⌐ <sentence> | ⌐.

The term <sentence> represents the programming language goal symbol and the symbol _|_ is a terminal symbol reserved for this production.

The parser's basic program structure is a parser loop over the discrete time steps defined by parser state changes. Each cycle searches for and performs one reduction or one transition. While a parser need only maintain a state stack, the current parser state and the lookahead symbol, more information is maintained for tracing, semantic and error correction purposes. The push-down stack can have several fields, one field holding the token just read from the input stream when the state was stacked, another field holding the actual character string read from the input stream, another field holds a serial number for the token and extra fields can be used for maintenance by a semantic synthesizer.

Discussion of the Prior Art

Prior art parse tables for finding reductions (FIG. 2) are constructed as four tables: the lookahead set table 18 representing sets of terminal symbols, the lookahead set numbers table 17 representing the terminal symbol sets that a particular reduction can be made on, the first lookahead table 15 representing the beginning of a collection of lookahead set numbers for a particular parser state, and production table 16 representing which production to reduce by for a corresponding lookahead set number. To find a possible reduction from state S with lookahead symbol X, the prior art parser uses the first lookahead table 15 at positions S 20 and S+1 22 to determine the collection of lookahead set numbers 30 to 33 for state S. Then, the prior art parser checks whether or not the lookahead symbol X is a member of any corresponding lookahead set 34, 35 or 36. If symbol X is found to be a member of any corresponding lookahead set, then a reduction is performed in the corresponding production P 25 as indicated by the production table 16.

Prior art parser tables for finding read transitions (FIG. 3) include three parse tables: the entrance symbol table 42 representing the symbol which must be read to enter a parse state, the transition state table 41 representing the target parse states of all possible read transitions, an a first transition table 40 representing a beginning of a collection of possible target states from a particular parser state. To find a possible read transition from parser state S with lookahead symbol X, a prior art parser uses first transition table 40 at positions S 46 and S+1 47 to determine the collection of possible target states 50 to 52. The prior art parser then determined whether or not lookahead symbol X appears as the entrance symbol 60, 61 or 62 for each possible target parser state. When the lookahead symbol X is found, as at symbol position 61, then a next read transition is made to target parser state S' 50 on lookahead symbol X.

SUMMARY OF THE INVENTION

It is an object of this invention to provide an enhanced, more time-efficient parsing system and method than found in the prior art.

In accordance with the invention, first table means are established and used for indicating a plurality of reductions and read transitions. A linearized set of vectors form an output table having input table means having a given plurality of input entries and an output table means having a given plurality of output entries, the input and output entries that correspond are at a same offset (logically) within the table. Searching is conducted in the single linearized table without indirect references to any table. The input and output entries being parallel vectors provide a one-for-one base plus offset addressing in the input and output table means. This arrangement is provided both for reduction and transition processing.

The foregoing and other objects, features, and advantages of the invention will be apparent from the following more particular description of preferred embodiments of the invention, as illustrated in the accompanying drawings.

DETAILED DESCRIPTION

Figure 4:
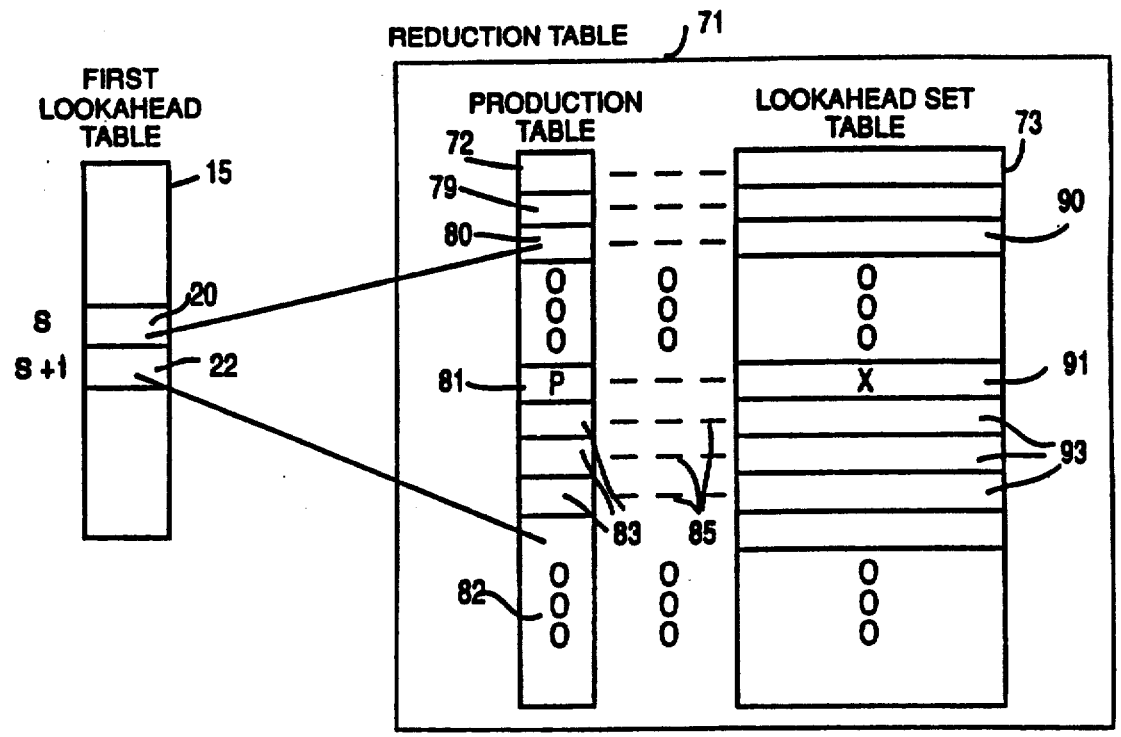
FIGS. 4 and 5 respectively illustrate the construction of parsing tables using the present invention for reductions and read transitions.

Referring now more particularly to the appended drawing, like numerals indicate like parts and structural features in the various figures. FIG. 4 shows a preferred embodiment of the invention for performing reductions in a given parser state. The first lookahead table 15 is still used. Reduction table means 71 is a linearized table of parallel vectors of productions and lookahead sets, respectively in separate data structures 72 and 73. Data structures 72 and 73 have an identical number of entries and utilize base plus offset addressing using a different base but the same offsets. The parser 11 upon checking for possible reductions in state S 20 determines the collection of productions 80, 81 and 83 (83 denotes a plurality of productions). State S+1 22 has a collection of productions that begin at numeral 82. Horizontal dashed lines collectively denominated by numeral 85 symbolize the parallel vector relationship between the production table 72 entries and the lookahead set table 73. For example, production 80 is at the same offset as lookahead set 90, production P 81 is at the same offset as lookahead set 91, etc. The parser 11 for state S scans lookahead sets 90 through 93 for lookahead symbol X by directly accessing the table 73. When symbol X is found in lookahead set 91, the parser reduces using the corresponding production P 81.

Figure 1:
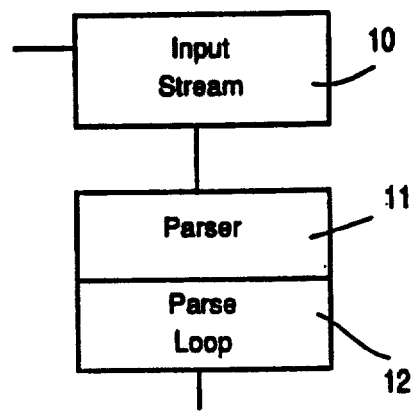
FIG. 1 is a simplified diagram of a parsing system.
Figure 2:
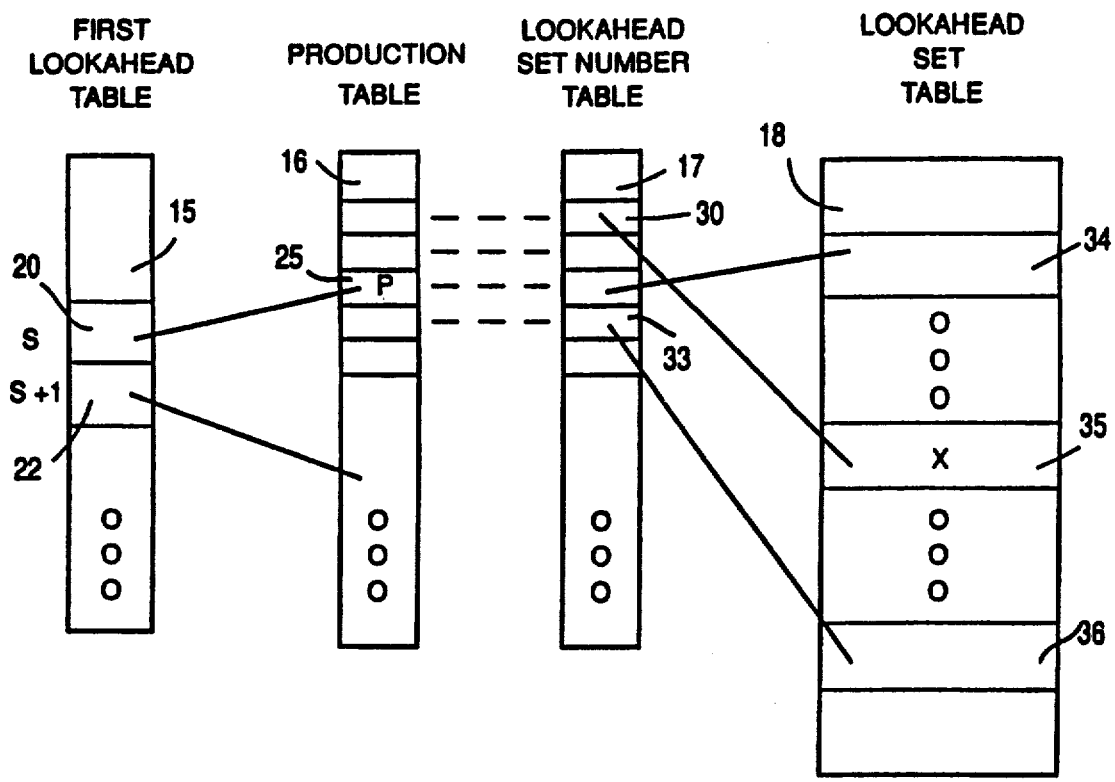
FIGS. 2 and 3 illustrate the prior art respectively for executing reductions and read transitions in a parser.
Figure 3:
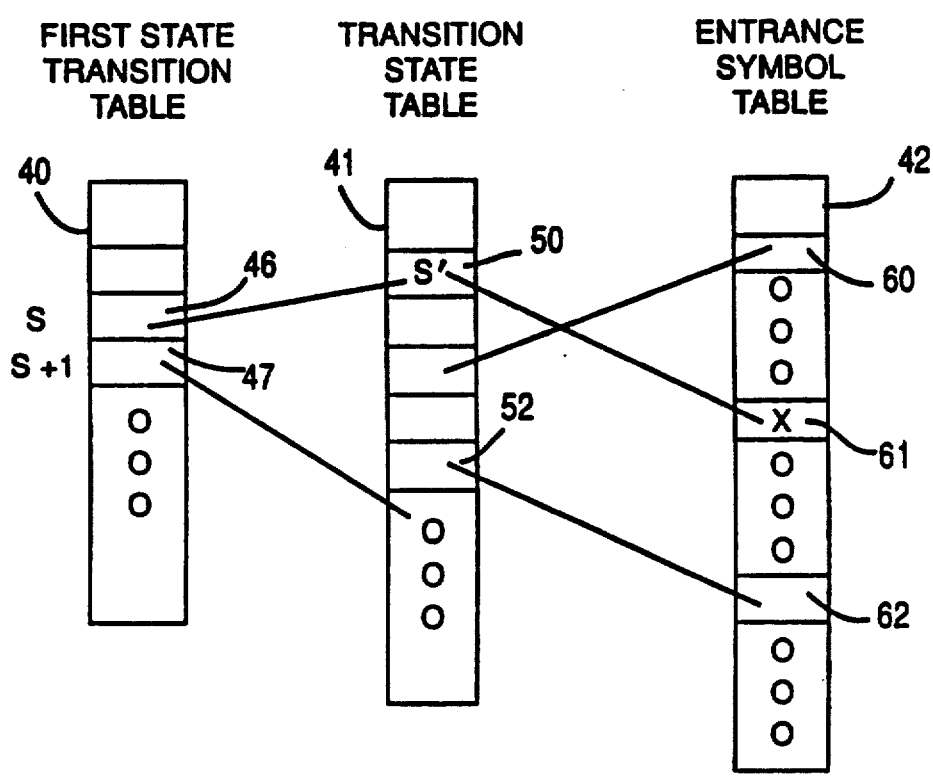
Figure 5:
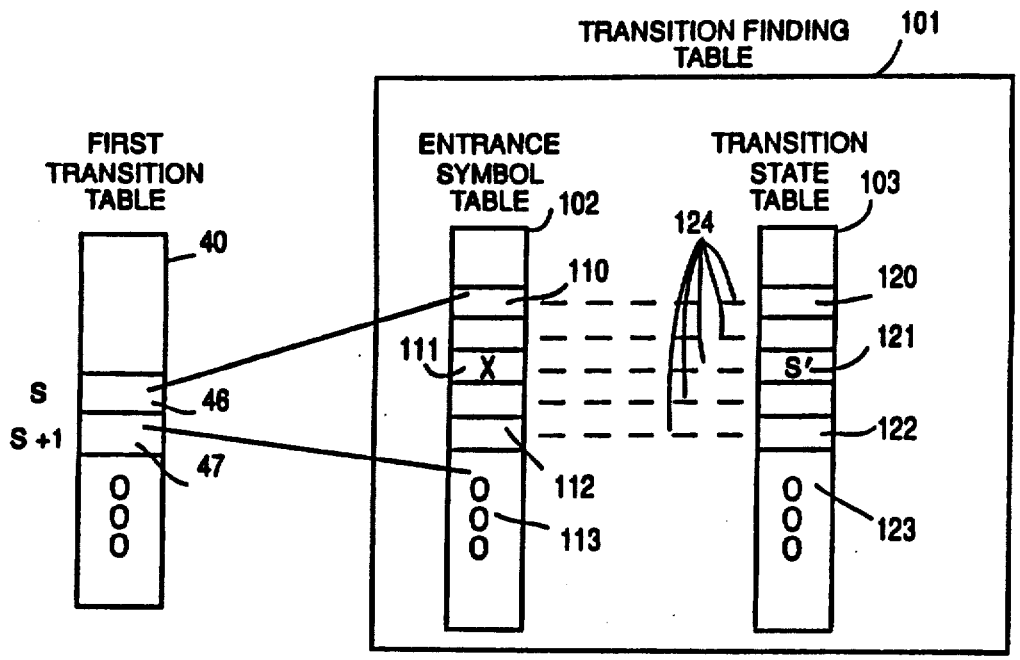

FIG. 5 illustrates the parser tables in accordance with the invention for finding read transitions, the alternate operation in each state to performing a reduction via finding the productions. First state transition table 40 is used as in the prior art. The transition finding table 101 is vectorizable as reduction table 71, i.e. table 101 includes two data structures, the entrance symbol table 102 and transition state table 103. Each of the tables 103 and 102 have an identical number of entries or positions and each entry having a one-for-one-correspondence with one and only one entry in the other table within table 101. A collection of entrance symbols 110, 111 and 112 are for state S 46. A new read transition from state S 46 and symbol X 111 is found by searching for symbol X in the collection of entrance symbols 110–112 of table 102. The first transition of state S+1 47 at area 113 of table 102 determines the last of the entrance symbols 112 for state S 46. Since each entry in the entrance symbol table 102 has a corresponding entry in the transition state table 103, this searching is completed without searching the transition state table 103. That is, entrance symbols 110–112 in table 102 have corresponding target state S' 120–122 in table 103. Each such corresponding entry is deemed to be in a parallel vector. Once the entrance symbol X 111 is found in entrance symbol table 102, transition state table 103 is explicitly addressed to obtain the target state S'121, i.e. the offsets in the two tables are identical for corresponding entries, respectively. This search is conducted in but one table rather than through two tables as in the prior art of FIG. 3.

A parser loop 12 for practicing the present invention is set forth below in pseudo-code form.

S is the current parse state. Then, transition_state (first_transition (S)) through transition_state (first_transition (S+1)−1) are the collection of potential target states with entrance_symbol (first_transition (S)) through entrance_symbol (first_transition (S+1)−1) being the entrance symbols to transition to those states. Such a range could be empty.

The term first_lookahead represents a vector NO_STATES+1 long of pointers into the vector lookahead_set and the vector production. The entries between the first_lookahead (S) and first_lookahead (S+1)−1 in the lookahead_set and production form the lookahead set production pairs needed for reductions in state S. This range may also be empty. The term production represents a vector of production numbers used as one-half of lookahead set of production pairs. This vector contains as many entries as there are reductions in the parser tables and is used with first_lookahead described above. The term left_symbol is a vector having a length of NO_PRODUCTIONS. The entry in position p-1 is the non-terminal on the left side of the production p (left of the : as listed in the Background of the Invention). Such a non-terminal is pushed back on the stack when a reduction by p is performed. The term length_reduction represents a vector having a length of NO_PRODUCTIONS. Entry p-1 is the length of the right side of

```
PARSE_LOOP:
    FOR    i=first_lookahead(S) TO first_lookahead(S+1)−1 DO
           IF    (X IN lookahead_set(i)) THEN
                 S=POP(length_reduction (production(i)))
                 Y=left_symbol (production(i))
                 FOR    j=first_transition(S) TO first_transition(S+1)−1 DO
                        IF    (Y=entrance_symbol(j)) THEN
                              S=transition_state(j)
                              IF (S=FINAL_STATE) STOP
                              PUSH(S, Y)
                              GOTO PARSE_LOOP
                        ENDIF
                 ENDFOR
           ENDIF
    ENDFOR
    FOR    i=first_transition(S) TO first_transition(S+1)−1 DO
           IF    (X=entrance_symbol(i)) THEN
                 S=transition_state(i)
                 PUSH(S, X)
                 READ(X)
                 GOTO PARSE_LOOP
           ENDIF
    ENDFOR
    INPUT_ERROR( )
```

In the above pseudo-code listing the term (i) represents the offset in the parse tables 72, 73, 102 and 103. Note that the searching is conducted in tables 73 and 102 while access to tables 72 and 103 is explicit offset address (i or j). The terminal FINAL_STATE represents a constant or value which represents the final or last reduction to <system goal symbol>. This value indicates the termination of the current parsing operation. Completion of a parse always occurs with a last production and performing a transition to the FINAL_STATE. The term entrance_symbol represents a vector of integers representing the appropriate entrance symbols which must be read to enter state S. The term first_transition represents a vector of pointers into the entrance_symbol vector. This vector has a length of NO_STATES+1 where NO_STATES is a constant indicating the number of states in the parse tables 72 and 73 and in parse tables 102 and 103. For identifying a read transition, the first_transition vector and transition_state vector are used. Assume that state production p and is used to POP the stack when reducing using production p. The term lookahead_set represents a vector of lookahead sets. There are at least as many entries as there are terminals in each lookahead set. Each lookahead set is a bit vector over the terminal symbols. Terminal S is in set L if and only if bit S of set L is one. The number of lookahead sets is determined by the number of possible reductions in all possible states. Other aspects of the pseudo-code listing are apparent from inspection of the listing.

While the invention has been particularly shown and described with reference to preferred embodiments thereof, it will be understood by those skilled in the art that various changes in form and details may be made therein without departing from the spirit and scope of the invention.

We claim:

1. In a machine-effected method of operating a parser portion of a compiler for parsing a computer program in an input stream, said computer program being written in a predetermined programming language having a given grammar, including the machine-executed steps of:

automatically generating a parser state table means having a plurality of state indicating entries, one entry means for indicating each possible state of the parser, each of said state indicating entries including a declaration of said predetermined programming language in said given grammar;

automatically generating a linearized vector table means having an input table including a given plurality of input entries respectively related to the parser state table means entries such that one or more of the input entries relate to a one of the state indicating entries, respectively, and an output table having a predetermined plurality of output entries, arranged said output entries to be identically addressable within the output table as the input entries are respectively addressed within the input table, said predetermined plurality of being equal to said given plurality; and parsing the computer program in the input stream using the established parser state table means and said linearized table means.

2. In the machine-effected method set forth in claim 1 further including the machine-executed steps of:

while generating the linearized table means, generating a given plurality of independent portions in the linearized table means, each said portion having a separate input table and an output table, arranging said input table and said output table in each said portion of the linearized table means to be identically addressable, respectively;

during said parsing step, identifying a program sentence in the computer program; and processing an identified program sentence using one of said plurality of independent portions.

3. In the machine-effected method set forth in claim 2, wherein the parsing includes read transitions between reduction steps, further including the machine-executed steps of:

in said step for generating said linearized table means, generating a reduction portion as a first one of the independent portions for reducing the identified program sentence; and in said step for generating said linearized table means, generating a read transition portion as a second one of the independent portions for processing said read transitions.

4. In the machine-effected method set forth in claim 3 further including the machine-executed steps of:

generating a production table that defines reductions for tokens being analyzed to be the input table of said reduction portion, generating a lookahead set table having sets of predetermined terminal symbols to be the output table of said reduction portion; and generating a table of entrance symbols as the input table in said read transition portion and generating a transition state table as the output table in said read transition portion.

5. In the machine-effected method set forth in claim 4 further including the machine-executed steps of:

performing said parsing step as a parse loop including automatically selecting a reduction loop or a transition loop;

in said reduction loop using only the reduction portion of said linearized table means including detecting a FINAL STATE for ending the parsing; and in said transition loop using only the transition portion of said linearized table means and always performing a reduction loop before ending the parsing.

6. In a machine-effected method of parsing a computer program in an input stream having tokens in the input stream that represent a sequence of structure of the computer program, during said parsing, sequentially creating parser states that respectively indicate status of the syntactical analysis for verifying structure and specification of the computer program expressions, one of said parsing states being a current parser state that indicates a current parsing step, including the machine-executed steps of:

generating first look tables, each of said first look tables including entries in said first look tables for identifying the parser states;

linear vector parsing means including generating an input means and generating input indicia in said input means such that each of the input indicia are in respective vectors, generating addresses for the input means having addresses respectively addressable from the first look tables, generating an output means including generating output indicia in said output means respectively in the same vectors as the input indicia; and parsing the computer program of the input stream including detecting a current parser state in the first look tables, then scanning the input indicia identifiable with the current parser state and then taking the output indicia in the respective vectors of the input indicia for reading a predetermined token from the input stream.

7. In the machine-effected method set forth in claim 6 further including a the machine-executed steps of:

in said linear vector parsing means output means, generating a given plurality of independent portions, and, in each of said independent portions, generating a separate input table and an output table including generating identical addresses for said input and output tables in each of said generated independent portions;

during said parsing step, identifying a program sentence in the computer program; and parsing the identified program sentence using only one of said plurality of independent portions.

8. In the machine-effected method set forth in claim 7 further including the machine-executed steps of:

in said output table means, generating a reduction portion in one of the independent portions for reducing the identified program sentence; and in said output table means, generating a read transition portion in a second one of the independent portions for processing read transitions.

9. In the machine-effected method set forth in claim 8 further including the machine-executed steps of:

in said reduction portion, generating a table of productions for defining reductions and a lookahead set table, generating entries in each of said reduction portion and lookahead set table at a same offset in said reduction portion and lookahead set table, respectively, for creating pairs of said respective reduction generated entries and respective generated entries in the lookahead set table; and in said read transition portion, generating table of entrance symbols for respectively representing a predetermined number of entrances to the parser states and generating a transition state table having a number of transition states equal to said predetermined number of entrance symbols, placing the entrance symbols and the transition states in the respective table of entrance symbols and transition state table at identical offsets for creating pairs so that a scan of the entrance symbols identifies the offset in the transition table of its identified transition state whereby a single scan of the entrance symbol table identifies an offset in the transition state table of the respective identified transition state.

10. In the machine-effected method set forth in claim 9 further including the machine-executed steps of:
performing said parsing step as a parse loop including automatically selecting a reduction loop or a transition loop;
in said reduction loop using only the table of productions and the lookahead set table and detecting a FINAL STATE for ending the parsing; and
in said transition loop using only the table of entrance symbols and the transition state table and always performing a reduction loop before ending the parsing.

11. In apparatus for parsing a computer program, including, in combination:
state means for indicating a current parser state;
reduction means for reducing program expressions and including a production table having a first number of productions and a lookahead set table having a second number of lookahead set entries, said second number being equal to said first number, each of the productions being paired with a respective one of the lookahead set entries and each respective paired lookahead set and production having an identical offset address in the respective tables in the reduction means;
read transition means for identifying read transitions in the computer program parsing and including an entrance symbol table having a second number of entrance symbols for entering respective ones of the parser states and a transition state table having a second number of representations of transition states, each of the entrance symbols being paired with a respective one of the transition states and being at an address offset in the entrance symbol table identical to the address offset of the respective paired representation of transition states; and
parse loop means connected to the state means, to the reduction means and to the read transition means for activating either the reduction means or the read transition means for each state indicated in the state means and including changing the state indicated in the state means only when the transition means is used.

* * * * *

UNITED STATES PATENT AND TRADEMARK OFFICE
CERTIFICATE OF CORRECTION

PATENT NO. : 5,193,192

DATED : March 9, 1993

INVENTOR(S) : David A. Seberger

It is certified that error appears in the above-indentified patent and that said Letters Patent is hereby corrected as shown below:

Under Column 1, Line 54, please delete "A such a" and insert --Such a-- therefore.

Under Column 2, Lines 31 and 32, please insert --to-- after desired and before enhance, therefore.

Under Column 3, Line 4, please delete "stages" and insert --states-- therefore.

Under Column 3, Line 14, please delete "13 | 13" and insert --_ | _-- therefore.

Under Column 3, Line 14, please delete "> | 13." and insert -->_ | _.-- therefore.

Under Column 3, Line 54, please delete "parser" and insert --parse-- therefore.

Under Column 3, Line 59, please delete "an a first" and insert --and a first-- therefore.

Under Column 8, Line 21, please insert --generating-- before linear, therefore.

UNITED STATES PATENT AND TRADEMARK OFFICE
CERTIFICATE OF CORRECTION

PATENT NO. : 5,193,192
DATED : March 9, 1993
INVENTOR(S) : David A. Seberger

It is certified that error appears in the above-indentified patent and that said Letters Patent is hereby corrected as shown below:

Under Column 8, line 21, please insert --generating-- before linear, therefore.

Signed and Sealed this

Third Day of September, 1996

Attest:

BRUCE LEHMAN

Attesting Officer  Commissioner of Patents and Trademarks